(12) United States Patent
Murakami et al.

(10) Patent No.: US 7,044,503 B2
(45) Date of Patent: May 16, 2006

(54) COLLAPSIBLE TELESCOPIC STEERING APPARATUS

(75) Inventors: Tetsuya Murakami, Nara (JP); Shuzo Hirakushi, Nara (JP); Yoshitaka Noda, Kasaoka (JP)

(73) Assignees: Koyo Seiko Co., Ltd., Osaka (JP); Hiruta-Kogyo Co., Ltd., Hiroshima (JP)

( * ) Notice: Subject to any disclaimer, the term of this patent is extended or adjusted under 35 U.S.C. 154(b) by 155 days.

(21) Appl. No.: 10/452,721

(22) Filed: Jun. 3, 2003

(65) Prior Publication Data

US 2003/0227163 A1      Dec. 11, 2003

(30) Foreign Application Priority Data

Jun. 5, 2002    (JP) ............................. 2002-164545

(51) Int. Cl.
*B62D 1/18*        (2006.01)
(52) U.S. Cl. .................................................. 280/775
(58) Field of Classification Search ................ 280/775, 280/777, 779; 74/492, 493
See application file for complete search history.

(56) References Cited

U.S. PATENT DOCUMENTS

| | | | |
|---|---|---|---|
| 3,392,599 A * | 7/1968 | White ......................... | 74/492 |
| 3,504,568 A | 4/1970 | Nakamura et al. | |
| 3,538,785 A * | 11/1970 | Grancon ....................... | 74/492 |
| 3,877,319 A * | 4/1975 | Cooper ......................... | 74/492 |
| 4,269,043 A * | 5/1981 | Kizu et al. .................... | 464/83 |
| 4,531,619 A * | 7/1985 | Eckels ......................... | 188/371 |
| 4,867,003 A * | 9/1989 | Beauch et al. ................ | 74/492 |
| 4,915,412 A * | 4/1990 | Yuzuriha et al. ............. | 280/775 |
| 5,476,284 A * | 12/1995 | DuRocher et al. .......... | 280/777 |
| 5,758,545 A | 6/1998 | Fevre et al. | |
| 5,813,794 A * | 9/1998 | Castellon ................. | 403/359.5 |

FOREIGN PATENT DOCUMENTS

| | | |
|---|---|---|
| DE | 195 42 491 C1 | 11/1995 |
| GB | 1 300 665 | 12/1972 |

* cited by examiner

*Primary Examiner*—Faye M. Fleming
(74) *Attorney, Agent, or Firm*—Rabin & Berdo, PC (57) ABSTRACT

A collapsible telescopic steering apparatus includes a steering column having an outer tube and an inner tube. The tubes can be switched between a press-fit state and a loose-fit state. The position of a steering wheel is adjusted by way of relative sliding movement of the loose-fitted tubes along an axial direction thereof. A shock absorbing projection is provided on at least one of an inner periphery of the outer tube and an outer periphery of the inner tube, as confronting to the counterpart tube. The shock absorbing projection is normally spaced away from the counterpart tube but is deformed as pressed against the counterpart tube in association with relative sliding movement of the press-fitted tubes upon collision, thereby absorbing the shock of the collision.

10 Claims, 6 Drawing Sheets

COLLAPSIBLE TELESCOPIC STEERING APPARATUS

BACKGROUND OF THE INVENTION

1. Field of the Invention

The present invention relates to a collapsible telescopic steering apparatus adapted to reduce shock during vehicle collision.

2. Description of Related Arts

One type of collapsible steering apparatus has an arrangement wherein a pair of tubes of a steering column are press-fitted with each other so as to be slidably movable relative to each other during collision for absorption of the shock of the collision.

On the other hand, there is proposed a mechanism which accomplishes a telescopic adjustment function based on the above pair of tubes adapted for relative sliding movement for shock absorption, the telescopic adjustment function permitting the positional adjustment of a steering wheel with respect to the axial direction of the tubes. In one exemplary arrangement, an outer tube is formed with a slit at a fitting portion thereof so that the outer tube can releasably clamp an inner tube. The outer tube establishes a press-fit state by clamping the inner tube. On the other hand, the outer tube establishes a loose-fit state by unclamping the inner tube thereby permitting the telescopic adjustment.

In order to permit the telescopic adjustment, however, the outer tube cannot clamp the inner tube with such a great force. Hence, the definition of shock absorption load at vehicle collision is decreased in the degree of freedom.

SUMMARY OF THE INVENTION

It is an object of the invention is to provide a collapsible telescopic steering apparatus adapted for the telescopic adjustment and features a high degree of freedom for the definition of shock absorption load.

In accordance with a preferred aspect of the invention, a collapsible telescopic steering apparatus comprises: a steering column including an outer tube and an inner tube engaged with each other in a manner to be switched between a press-fit state and a loose-fit state; a telescopic adjustment mechanism for adjusting the position of a steering wheel by way of relative sliding movement of the outer tube and the inner tube along an axial direction thereof when the outer and inner tubes are switched to the loose-fit state; and a shock absorbing projection disposed on at least one of an inner periphery of the outer tube and an outer periphery of the inner tube and opposing the periphery of the counterpart tube; wherein the shock absorbing projection is normally spaced away from the counterpart tube but is deformed as pressed against the counterpart tube in association with the relative sliding movement of the tubes in the press-fitted state during collision, thereby absorbing the shock of the collision.

According to the aspect, the shock absorbing projection is deformed as pressed against the corresponding tube during collision, thereby producing shock absorption load. Therefore, a sufficient level of shock absorption load can be attained. In addition, the shock absorbing projection is always spaced away from the corresponding tube except at the time of the shock absorption, presenting no problem to the telescopic adjustment. Since the shock absorbing projection is not involved in the telescopic adjustment, the specifications of the shock absorbing projection may be freely defined, resulting in an increased degree of freedom for the definition of shock absorption load.

DETAILED DESCRIPTION OF THE PREFERRED EMBODIMENT

Hereinbelow, description is made on a collapsible telescopic steering apparatus (hereinafter, simply referred to as "steering apparatus") according to one embodiment of the invention.

Figure 1:
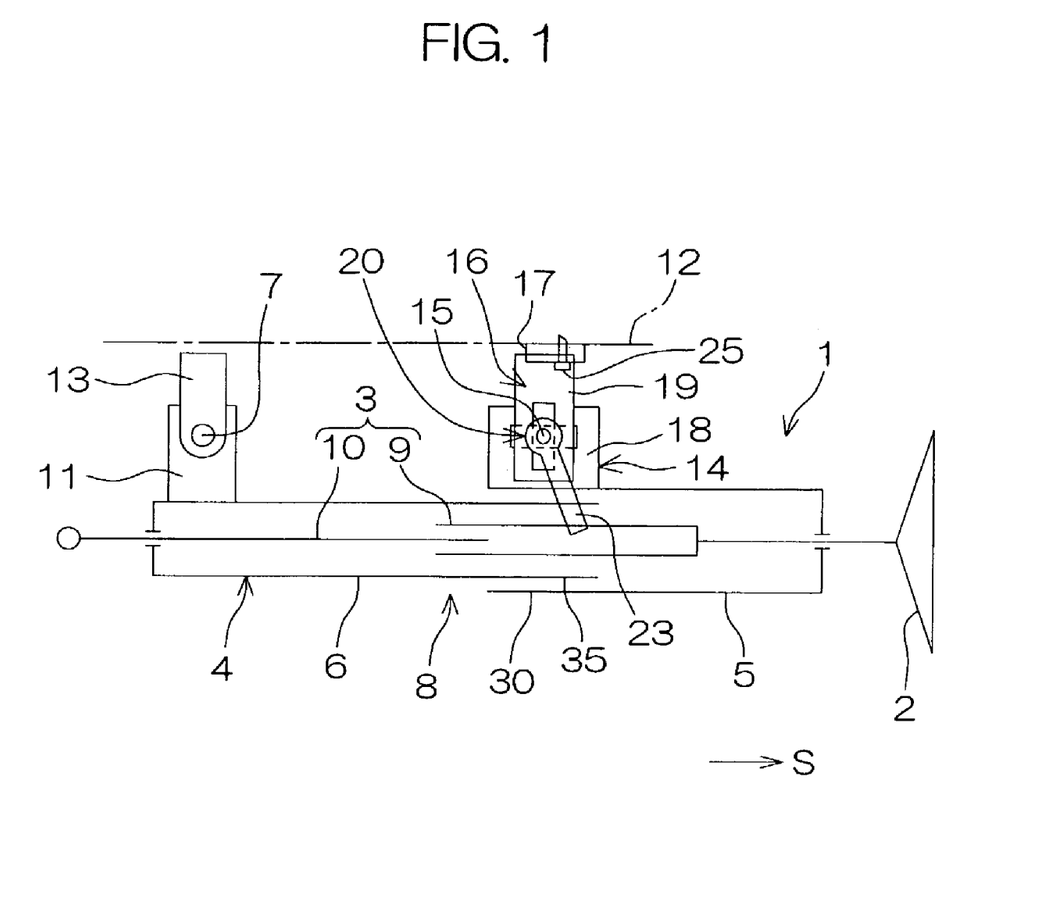
FIG. 1 is a schematic side view showing an arrangement of a collapsible telescopic steering apparatus according to one embodiment of the invention.

As shown in FIG. 1, a steering apparatus 1 includes a steering shaft 3 for transmitting a motion of a steering wheel 2 in order to steer road wheels (not shown), and a steering column 4 for rotatably supporting the steering shaft 3 as extended therethrough. The steering shaft 3 is connected with a rack and pinion type steering mechanism (not shown). When the steering wheel 2 is turned, the rotation of the steering wheel is transmitted to the steering mechanism via the steering shaft 3 and the like, whereby the road wheels are steered.

The steering shaft 3 includes an upper shaft 9 constituting an upper part thereof, and a lower shaft 10 constituting a lower part thereof. The upper shaft 9 and the lower shaft 10 are coupled to each other by means of a joint structure such as a spline structure in a manner to be slidably movable relative to each other along the axes thereof and unitarily rotatable. The upper and lower shafts are supported in the steering column 4 via a plurality of bearings (not shown).

The steering column 4 includes an outer tube 5 for rotatably supporting the upper shaft 9, and an inner tube 6 for rotatably supporting the lower shaft 10 as fitted in the outer tube 5. Both the tubes 5, 6 are disposed in alignment with the steering shaft 3.

The steering apparatus 1 is mounted to a vehicle body 12 (a part of which is represented by a dot-and-dash line) in a manner, for example, that the steering wheel 2 is positioned at a higher position so that an axial direction S of the tubes 5, 6 is inclined with respect to the anteroposterior direction of the vehicle. It is noted, however, that the axial direction S of the tubes is depicted as horizontal direction for simplicity.

The steering column 4 is mounted to the vehicle body 12 via a lower bracket 11 secured to the inner tube 6, a tilt axis 7, and a stationary bracket 13 secured to the vehicle body 12. This permits the steering column 4 to be supported as allowed to pivot about the tilt axis 7, but restricts the axial movement of the inner tube 6 of the steering column 4.

A longitudinally intermediate portion of the steering column 4 is fixed to the vehicle body 12 via an upper bracket 14 secured to the outer tube 5, a support shaft 15, a stationary bracket 16 secured to the vehicle body 12, a coupling member 17 and the like. The support shaft 15 is extended through transverse slots formed in side plates 18 of the upper bracket 14 and extended longitudinally with respect to the steering column 4, and vertical slots formed in side plates 19 of the stationary bracket 16 and extended in a direction to intersect the above transverse slots.

As released from a locked state by a lock mechanism 20, the support shaft 15 is allowed to move along the transverse slots and the vertical slots, thereby accomplishing a tilt adjustment function and a telescopic adjustment function. It is noted that the tilt adjustment function may be dispensed with.

The coupling member 17 has a so-called capsule structure, which includes a resin member 25 designed to interconnect the vehicle body 12 and the stationary bracket 16 and to be broken during the shock absorption. The resin member 25 is broken upon collision thereby integrally releasing the stationary bracket 16, the outer tube 5 of the steering column 4 and the like from the vehicle body 12 in the forward direction of the vehicle body 12. It is noted that the coupling member 17 may be replaced by any of the known mechanisms designed to release the steering column 4 from the vehicle body 12 upon collision.

Under normal conditions (all other times than the vehicle collision), the steering apparatus 1 permits the steering column 4 to pivot about the tilt axis 7 for the tilt adjustment of the steering wheel 2.

Figure 2A:
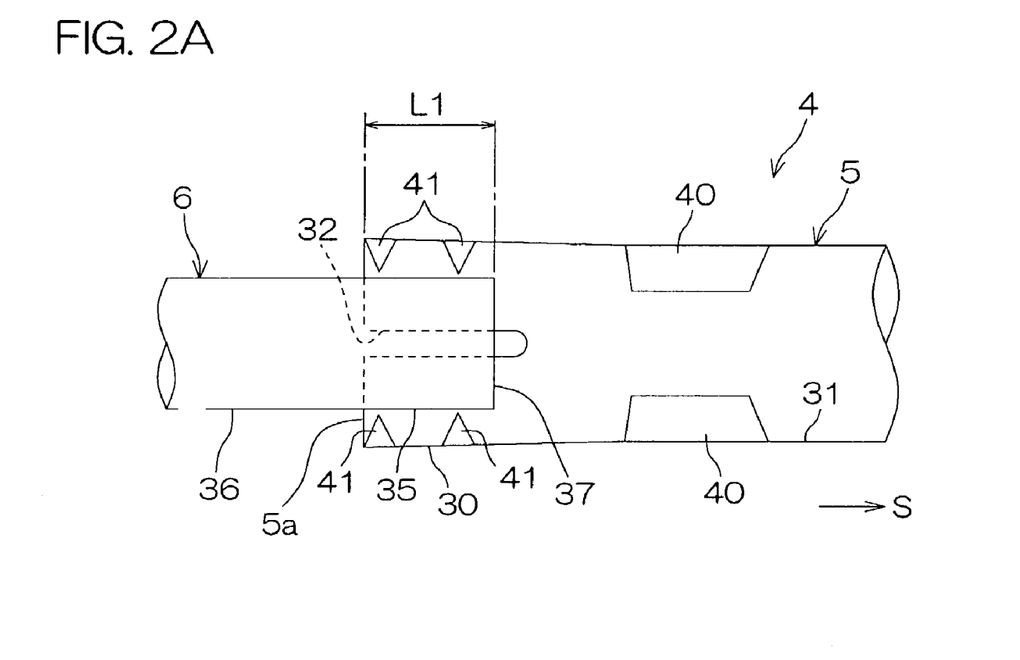
FIGS. 2A and 2B are schematic diagrams showing the motion of the steering apparatus of FIG. 1 during telescopic adjustment, FIG. 2A showing loose fitted tubes adjusted to fit with each other for a minimum fitting length, FIG. 2B showing the loose fitted tubes adjusted to fit with each other for a maximum fitting length.
Figure 2B:
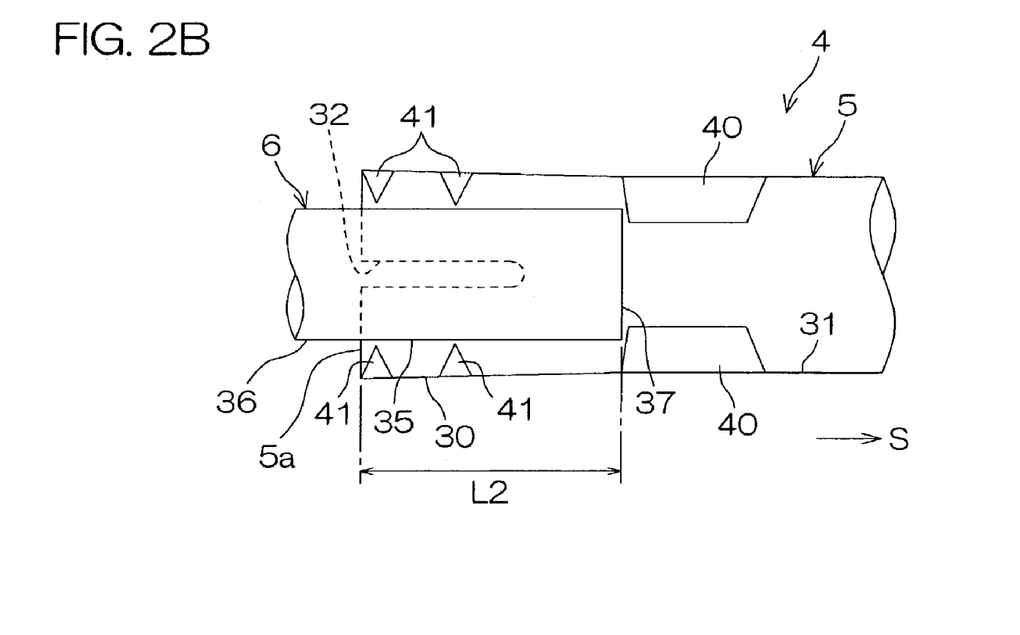

As shown in FIGS. 2A and 2B, the steering apparatus 1 is arranged such that the tubes 5, 6 are slidably moved relative to each other along the axial direction thereof for varying the length of their fitting portions 30, 35 (fitting length), thereby telescopically adjusting the position of the steering wheel 2 within a predetermined range.

Figure 3A:
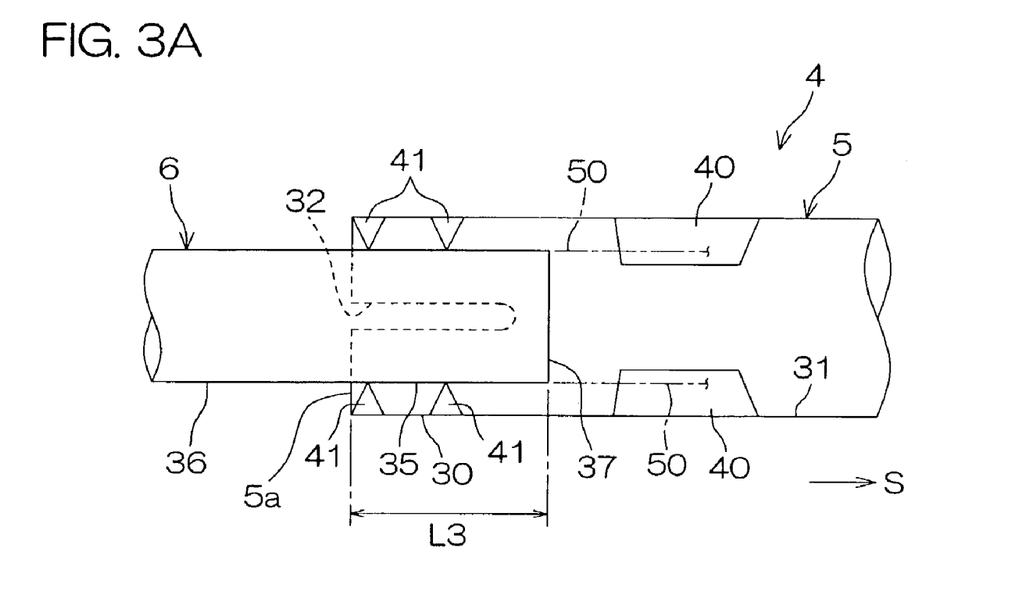
FIGS. 3A and 3B are schematic diagrams showing the motion of the steering apparatus of FIG. 1 during shock absorption, FIG. 3A showing a state where the tubes telescopically adjusted to fit with each other for a predetermined fitting length are press-fitted with each other, FIG. 3B showing a state of the tubes during the shock absorption.
Figure 3B:
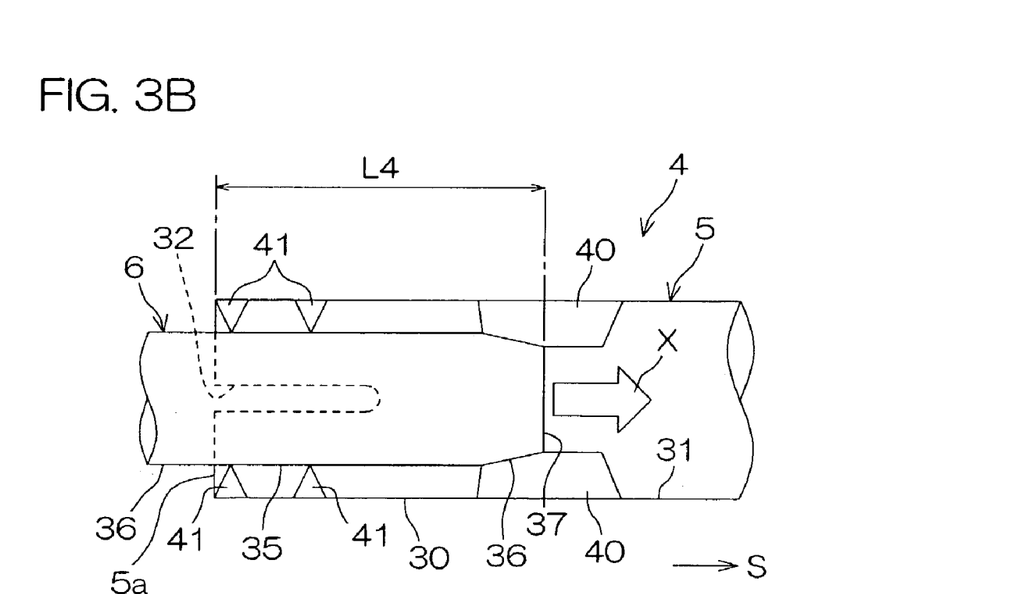

Furthermore, the steering apparatus 1 is arranged such that the tubes 5, 6 are slidably moved relative to each other during collision of the vehicle, thereby deforming a shock absorbing projection 40 for absorption of the impact energy, as shown in FIGS. 3A and 3B.

Returning to FIG. 1, the steering apparatus 1 has the following telescopic adjustment mechanism 8. That is, the telescopic adjustment mechanism 8 can be switched by manipulating an operation lever 23 to be described hereinlater between a press-fit state to inhibit the tubes 5, 6 from being slidably moved relative to each other by a normal input via the steering wheel 2 and a loose-fit state to permit the aforesaid normal input to cause the relative sliding movement of the tubes 5, 6. Specifically, as shown in FIG. 3A, the press-fit state is established by pressing projections 41 on an inner periphery 31 of the outer tube 5 pressing against an outer periphery 36 of the inner tube 6. As shown in FIGS. 2A and 2B, on the other hand, the loose-fit state is established by releasing the inner tube from the pressing force of the pressing projections 41.

In the loose-fit state, as shown in FIGS. 2A and 2B, the tubes 5, 6 may be slidably moved relative to each other to vary the fitting length between a minimum fitting length L1 (see FIG. 2A) and a maximum fitting length L2 (see FIG. 2B) thereby accomplishing the telescopic adjustment within the predetermined telescopic adjustment range. The predetermined telescopic adjustment range is equal to a difference (L2−L1) between the maximum fitting length L2 and the minimum fitting length L1.

The tubes 5, 6 adjusted for their positions relative to each other in the loose-fit state are switched to the press-fit state, as shown in FIG. 3A, so that the relative positions of the tubes 5, 6 are retained by a predetermined retention force. Unless a force exceeding the above predetermined retention force is applied, the tubes 5, 6 cannot be moved relative to each other.

In an event of vehicle collision where an impact force overcoming the above predetermined retention force is exerted axially of the steering shaft 3, for example, the tubes 5, 6 maintained in the press-fit state are slidingly moved relative to each other from the positions shown in FIG. 3A to the positions shown in FIG. 3B.

As shown in FIGS. 3A and 3B, the steering apparatus 1 is provided with the shock absorbing projection 40 for shock absorption on the inner periphery 31 of the outer tube 5. Regardless of how the tubes 5, 6 are engaged with each other (the press-fit state or the loose-fit state), the shock absorbing projection 40 is normally (at all other times than collision) positioned out of interference with the inner tube 6 located within the telescopic adjustment range, as shown in FIGS. 2A and 2B. That is, the shock absorbing projection 40 of the outer tube 5 is normally axially spaced away from the inner tube 6, thus causing no interference with the telescopic adjustment.

When the steering column 4 is retracted due to collision, as shown in FIG. 3B, the shock absorbing projection 40 is pressed against the inner tube 6 to be deformed. Specifically, the shock absorbing projection 40 is pressed against an end face 37 at an opening of the inner tube 6 and then brought into sliding contact with the outer periphery 36 of the inner tube 6. In this process, the shock absorbing projection 40 and the end portion of the inner tube 6 are deformed thereby to absorb the shock.

Furthermore, when the steering column 4 is retracted during the collision, the pressing projections 41 of the outer tube 5 are in sliding contact with the outer periphery 36 of the inner tube 6 thereby to absorb the shock. However, where the shock absorption depends solely upon the pressing projections 41 involved in locking or unlocking the telescopically adjusted tubes 5, 6 after the telescopic adjustment, the definition of shock absorption load has a low degree of freedom. As is shown in the drawing, the pressing projection 41 is wedge-shaped.

Hence, the embodiment as described above is arranged such that the shock absorbing projection 40 provided in the outer tube 5 on one side is pressed against the inner tube 6 on the other side to produce a shock absorption load during collision, thereby increasing the degree of freedom for the definition of shock absorption load to achieve a sufficient level of shock absorption load. In addition, the shock absorbing projection 40 does not normally interfere with the telescopic adjustment, as described above.

Thus, the shock absorbing projection 40 is not involved in the adjustment by the telescopic adjustment mechanism 8 and hence, the specifications of the projection 40 may be freely defined without being constrained by the conditions for the telescopic adjustment and on the basis of only the pursuit of greater shock absorption characteristics. As a result, the shock absorption load may be defined with an increased degree of freedom.

Where the shock absorbing projection 40 is used in combination with the pressing projections 41 or other shock absorbing mechanism for the shock absorption purpose, the shock absorbing projection 40 may be responsible for a relatively higher shock absorption load or otherwise, the other shock absorbing mechanism may be responsible for the relatively higher shock absorption load.

Figure 4A:
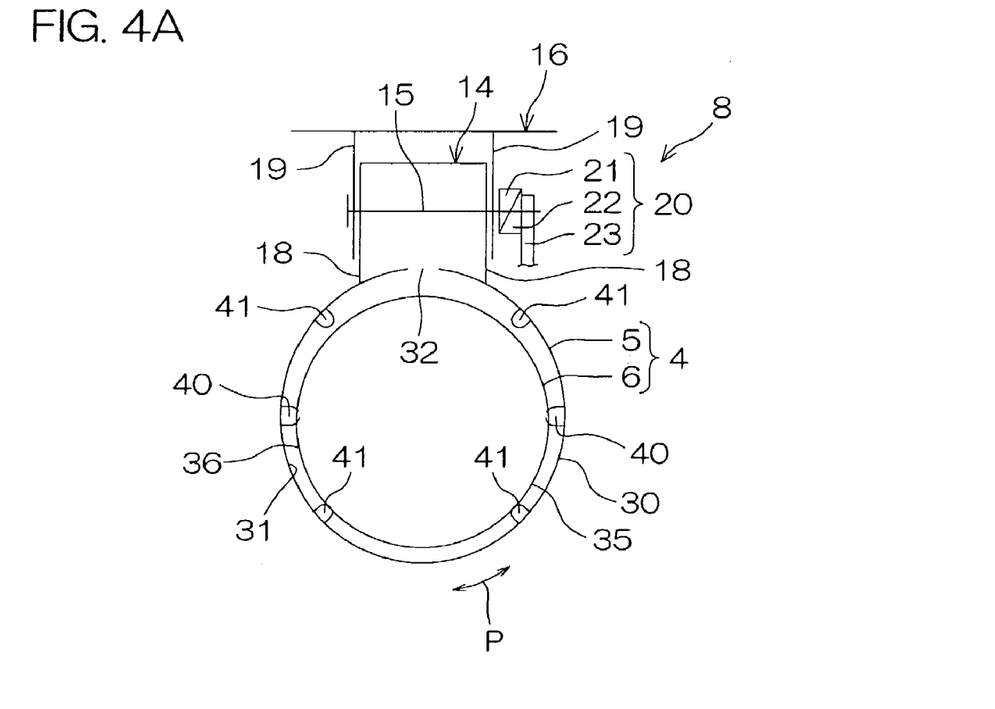
FIGS. 4A and 4B are schematic sectional views showing the motion of a telescopic adjustment mechanism shown in FIG. 1, FIG. 4A showing the tubes switched to the loose-fit state by the telescopic adjustment mechanism, FIG. 4B showing the tubes switched to the press-fit state by the telescopic adjustment mechanism.
Figure 4B:
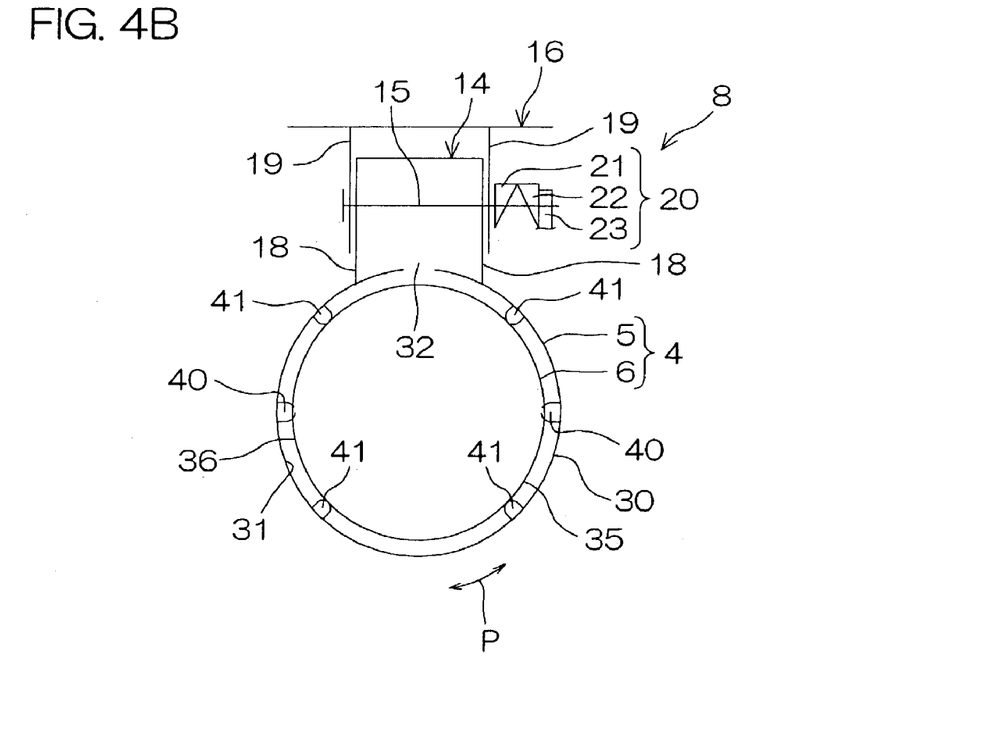

Referring to FIG. 4B, the shock absorbing projections 40 may be disposed on the inner periphery 31 of the outer tube 5 at plural places spaced away from each other along a circumferential direction P thereof, or for example, at two places equi-spaced along the circumferential direction P. The shock absorbing projection 40 is formed in a rib-like shape projecting radially inwardly of the tube 5 to a predetermined height. When the tubes 5, 6 are retained in the press-fit state under normal conditions, as shown in FIG. 3A, a crest of the shock absorbing projection 40 is at such a position as to interfere with a movement path 50 of the outer periphery 36 of the inner tube 6 during the shock absorption. What is needed is to provide at least one shock absorbing projection 40.

The shock absorbing projection 40 is formed in a shape such as a trapezoid form shown in FIGS. 3A and 3B to attain a required shock absorption load. The shock absorbing projection 40 has a rib-like shape extended for a predetermined length axially of the shaft 3 such as to absorb the impact in a required quantity of shock absorption stroke. The predetermined length is defined to be substantially equal to the required quantity of shock absorption stroke. The shock absorbing projection 40 may be formed, for example, by crimping the outer periphery of the outer tube 5 into projection protruding inwardly. Otherwise, the shock absorbing projection 40 may be formed by any of the known methods except for crimping.

Referring to FIG. 2B, the shock absorbing projection 40 is formed on the inner periphery 31 of the outer tube 5 on forward side of the fitting portion 30 of the outer tube 5 with respect to a sliding direction X (see FIG. 3B) that the inner tube 6 is slidingly moved in the outer tube 5 during the shock absorption, the fitting portion 30 defined when the telescopically adjusted tubes 5, 6 fit with each other for the maximum fitting length L2. That is, the shock absorbing projection is formed outside of the fitting portion 30 of the outer tube 5 in correspondence to the maximum fitting length L2.

This arrangement is preferred from a viewpoint of space saving because the shock absorbing projection 40 is contained in the outer tube 5. Particularly, in a case where the shock absorbing projection 40 adjoins the fitting portion 30 corresponding to the maximum fitting length L2, as shown in FIG. 2B, the shock absorbing projection 40 is quickly pressed against the end portion 37 of the inner tube 6 at the shock absorption so that a sufficient level of shock absorption energy can be obtained.

Referring to FIG. 2A, the outer tube 5 has a single slit 32 disposed in the fitting portion 30 as linearly extended from an open end 5a thereof along the axial direction thereof. Referring to FIG. 4A, the telescopic adjustment mechanism 8 includes the pair of side plates 18 of the upper bracket 14 which are secured to the outer tube 5 and confronting each other via the slit 32; and the lock mechanism 20 serving as gap adjustment means for adjusting a gap between the side plates 18 thereby radially expanding or contracting the outer tube 5.

The above slit 32 has such a width as to bring the radially contracted outer tube 5 and the inner tube 6 into the press-fit state and to bring the radially expanded outer tube 5 and the inner tube 6 into the loose-fit state.

The lock mechanism 20 may have any of the known arrangements. The lock mechanism 20 includes, for example, a pair of cam members 21, 22 constituting a cam mechanism for bringing the side plates 18, 19 of the upper bracket 14 and the stationary bracket 16 into pressed state; and the operation lever 23 for operating the cam mechanism. The lock mechanism 20 is mounted to the support shaft 15 extending through the side plates 18, 19. The cam member 21 is adapted to rotate in unison with the operation lever 23, whereas the cam member 22 is unrotatable.

As shown in FIG. 4A, when the lock mechanism 20 is in an unlocking state, the fitting portion 30 is radially expanded by its own resilient restoring force, for example.

When the operation lever 23 is manipulated, the cam mechanism brings the side plates 18, 19 of the brackets 14, 16 into the pressed state so that the gap between the side plates 18 of the upper bracket 14 is decreased. Accordingly, a clamping force is applied to the fitting portion 30 of the outer tube 5 to radially decrease the fitting portion 30 so that the pressure projections 41 in the outer tube 5 are pressed against the fitting portion 35 of the inner tube 6, as shown in FIG. 4B. Thus, the tubes 5, 6 are brought into the press-fit state by means of the pressing projections 41.

On the other hand, the above steps may be taken in the reverse order, so as to radially expand the fitting portion 30 of the outer tube 5 for bringing the tubes 5, 6 into the loose-fit state. The loose-fit state allows for the tilt adjustment and telescopic adjustment of the steering column 4.

As described above, the provision of the slit 32 facilitates the clamping or unclamping of the inner tube 6 by the outer tube 5 and hence, is favorable in the light of an easy telescopic adjustment under normal conditions. However, on the other hand, the slit 32 is detrimentally prone to allow the radial expansion of the outer tube 5 during the shock absorption. If this tendency affects the shock absorbing projections 40, the shock absorption load may be decreased. In contrast, as shown in FIG. 2A, in a case where the shock absorbing projection 40 is disposed in the outer tube 5 at place spaced away from the slit 32 along the axial direction of the tube 5, the reduction of the shock absorption load attributable to the slit 32 can be prevented.

Although the illustration is dispensed with, a structure for switching the tubes 5, 6 between the press-fit state and the loose-fit state may be made such that, for example, the slit 32 is formed angularly with respect to the axial direction of the outer tube 5 or plural slits 32 are formed. While the illustration is dispensed with, the above structure may also be arranged such that the fitting portion 35 of the inner tube 6 is pressed by the fitting portion 30 without the slit 32.

The fitting portions 30, 35 may be fitted with each other on their cylindrical surfaces. However, it is preferred that the fitting portions are fitted with each other via the above pressing projections 41.

The pressing projections 41 are disposed on the inner periphery 31 of the outer tube 5 at plural places equi-spaced along the circumferential direction P thereof. In the normal press-fit state, the pressing projections 41 are pressed against the outer periphery 36 of the fitting portion 35 of the inner tube 6. During the shock absorption, the pressing projections 41 are in sliding contact with the inner tube 6 as pressed thereagainst, thereby absorbing the shock. When the tubes are switched to the loose-fit state, the pressing projections 41 may be in contact with the inner tube 6 or out of contact therewith.

The sufficient level of shock absorption load can be attained by the combined use of the pressing projection 41 and the shock absorbing projection 40. The shock absorption load based on the pressing projection 41 can be produced at the moment of collision and is irrespective of the relative positional relation between the telescopically adjusted tubes 5, 6. Furthermore, the pressing projection 41 is pressed against the counterpart member at a smaller area, thus achieving an increased surface pressure. Accordingly, the pressing projection in the press-fit state can attain a sufficient force for retaining the inner tube 6 in a stable manner even when the outer tube 5 applies a small clamping force to the inner tube 6. Hence, the pressing projection can ensure the stable shock absorption load during collision.

Figure 5:
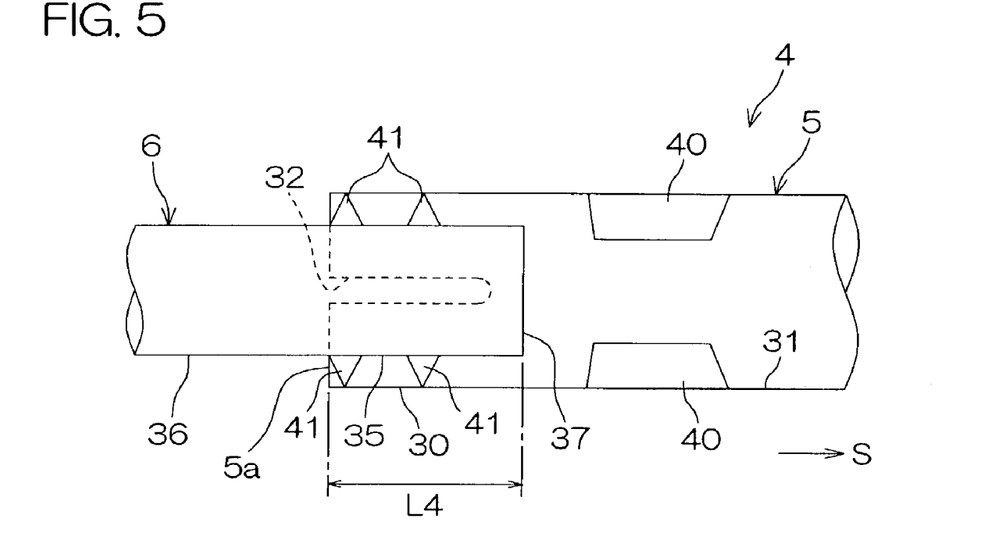
FIG. 5 is a schematic side view showing a principal part of a collapsible telescopic steering apparatus according to another embodiment of the invention.

As shown in FIG. 5, the pressing projections 41 may be provided on the outer periphery 36 of the fitting portion 35 of the inner tube 6 rather than in the outer tube 5. What is important is that at least one pressing projection is provided on at least one of the inner periphery 31 of the outer tube 5 and the outer periphery 36 of the inner tube 6.

As shown in FIG. 4A, in a case where the shock absorbing projections 40 and the pressing projections 41 are provided as shifted from each other with respect to the circumferential direction P of the outer tube 5, the shock absorbing projections 40 may be disposed in a region of the fitting portion 30 of the outer tube 5 which is fitted with the inner tube 6 for the maximum fitting length L2. However, when the shock absorbing projections 40 are disposed out of the region of the fitting portion 30 corresponding to the maximum fitting length L2, as shown in FIG. 2B, space for the shock absorbing projections 40 is easier to obtain and the specifications of the shock absorbing projection 40 can be defined with an increased degree of freedom.

Figure 6:
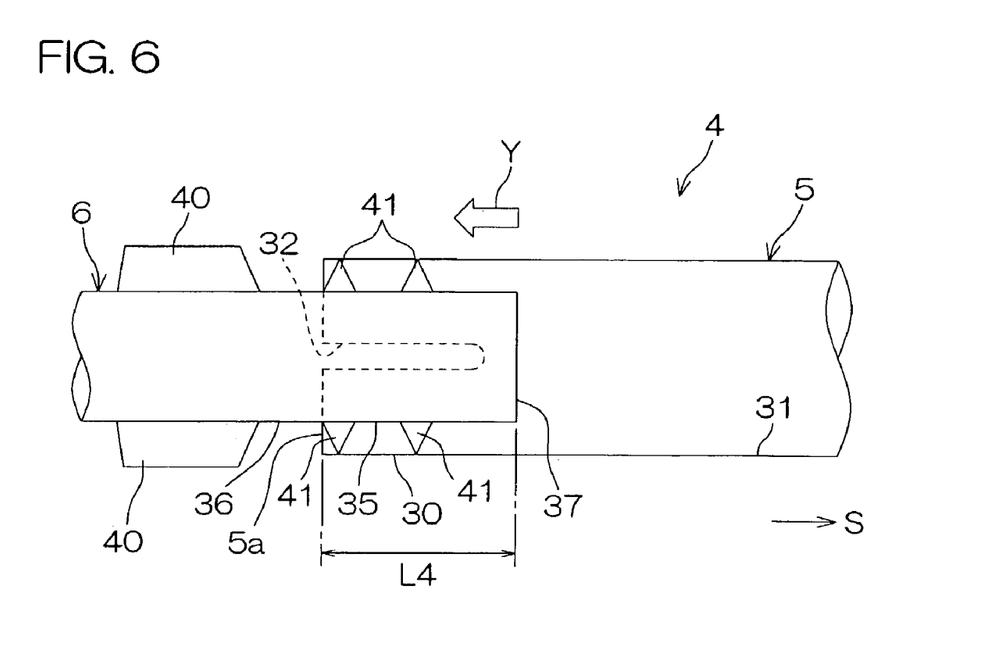
FIG. 6 is a schematic side view showing a principal part of a collapsible telescopic steering apparatus according to still another embodiment of the invention.

An alternative arrangement may be made, as shown in FIG. 6, wherein the shock absorbing projections 40 are provided on the outer periphery 36 of the inner tube 6. In this case, the shock absorbing projections 40 are pressed against, for example, the open end 5a of the outer tube 5 as the counterpart tube thereby to produce the shock absorption load during collision. Therefore, a sufficient shock absorption load may be attained just as in the aforesaid arrangement wherein the shock absorbing projections 40 are disposed in the outer tube 5. Furthermore, the definition of the shock absorption load is increased in the degree of freedom without producing interference with the telescopic adjustment.

It is preferred that the shock absorbing projections 40 are disposed on the outer periphery 36 of the inner tube 6, and particularly at places outside of the fitting portion 35 corresponding to the maximum fitting length L2, because, as mentioned supra, the space for the shock absorbing projections is easier to obtain and because the specifications of the shock absorbing projection 40 are defined with an increased degree of freedom.

It is preferred that the shock absorbing projections 40 are disposed on the periphery 36 of the outer tube 5, adjacent to the fitting portion 35, on forward side of the fitting portion 35 with respect to the sliding direction Y (see FIG. 6) because the shock absorption load can be immediately attained at the moment of collision.

However, in a case where the shock absorbing projections 40 and the pressing projections 41 are disposed as shifted from one each other with respect to the circumferential direction, the shock absorbing projections 40 may be disposed in the region of the fitting portion 35.

Figure 7:
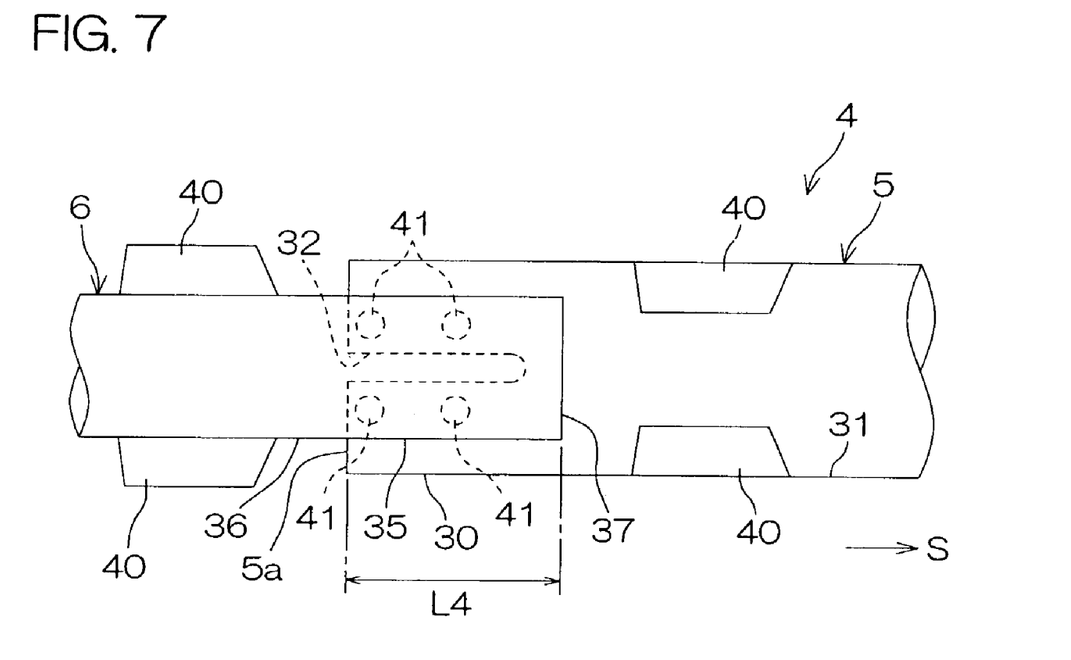
FIG. 7 is a schematic side view showing a principal part of a collapsible telescopic steering apparatus according to still another embodiment of the invention.

What is important is that the shock absorbing projection 40 may be provided on at least one of the inner periphery of the outer tube 5 and the outer periphery 36 of the inner tube 6, and may be normally spaced away from the other tube but be pressed thereagainst during the shock absorption. Alternatively, the shock absorbing projections 40 may be provided on both the inner periphery 31 of the outer tube 5 and the outer periphery 36 of the inner tube 6, as shown in FIG. 7.

While the invention has been described in details by way of the specific examples thereof, modifications, changes or equivalents thereto will occur to those skilled in the art fully understanding the above description. The scope of the invention is therefore to be determined by the following claims and equivalents thereto.

This application corresponds to Japanese Patent Application No. 2002-164545 filed with the Japan Patent Office on Jun. 5, 2002, the disclosure of which are incorporated hereinto by reference

The invention claimed is:

1. A collapsible telescopic steering apparatus comprising:
   a steering column including an outer tube and an inner tube engaged with each other in a manner to be switched between a press-fit state and a loose-fit state;
   a telescopic adjustment mechanism for adjusting the position of a steering wheel by way of relative sliding movement of the outer tube and the inner tube along an axial direction thereof when the outer and inner tubes are switched to the loose-fit state;
   a shock absorbing projection disposed on at least one of an inner periphery of the outer tube and an outer periphery of the inner tube and opposing the periphery of a counterpart tube;
   wherein the shock absorbing projection is normally spaced away from the counterpart tube but is deformed as pressed against the counterpart tube in association with the relative sliding movement of the tubes in the press-fitted state during collision, thereby absorbing the shock of the collision; and
   a pressing projection disposed on at least one of the inner periphery of the outer tube and the outer periphery of the inner tube and capable of pressing against the counterpart tube for establishing the press-fit state of the tubes under normal conditions;
   wherein the outer tube includes an open end and a slit axially extended from the open end, thus designed to be radially expanded or contracted; and
   wherein the outer tube is radially contracted, thereby establishing the press-fit state of the tubes, or is radially expanded, thereby establishing the loose-fit state of the tubes;
   whereby the pressing projection is slid on the counterpart tube in association with the relative sliding movement of the tubes during collision, thereby absorbing the shock of the collision.

2. A collapsible telescopic steering apparatus according to claim 1, wherein the shock absorbing projection is normally disposed away from fitting portions of the tubes fitted with each other for a maximum fitting length.

3. A collapsible telescopic steering apparatus according to claim 1, wherein the shock absorbing projection is formed on the inner periphery of the outer tube.

4. A collapsible telescopic steering apparatus according to claim 3, wherein the shock absorbing projection is normally disposed away from a fitting portion of the outer tube along a sliding direction that the inner tube is slidingly moved in the outer tube during the shock absorption, the fitting portion defined by the tubes fitted with each other for a maximum fitting length.

5. A collapsible telescopic steering apparatus according to claim 3, wherein the shock absorbing projection normally adjoins a fitting portion of the outer tube fitted with the inner tube for a maximum fitting length.

6. A collapsible telescopic steering apparatus according to claim 1, wherein the telescopic adjustment mechanism includes:
- a pair of side plates secured to the outer tube and opposing each other via the slit of the outer tube; and
- gap adjustment means for adjusting a gap between the pair of side plates in order to radially expand or contract the outer tube.

7. A collapsible telescopic steering apparatus according to claim 1, wherein the slit is spaced away from the shock absorbing projection along the axial direction of the outer tube.

8. A collapsible telescopic steering apparatus according to claim 1, wherein a plurality of pressing projections are disposed on the inner periphery of the outer tube spaced from each other along a circumferential direction thereof.

9. A collapsible telescopic steering apparatus according to claim 1, wherein the shock absorbing projection and the pressing projection are disposed as shifted from each other along the circumferential direction of the tubes.

10. A collapsible telescopic steering apparatus according to claim 1, wherein the pressing projection is wedge-shaped.

* * * * *